United States Patent [19]

Ochiai et al.

[11] Patent Number: 5,117,874

[45] Date of Patent: Jun. 2, 1992

[54] FLEXIBLE FLUID TRANSPORT PIPE HAVING HYDROGEN-INDUCED CRACKING RESISTANT HIGH-STRENGTH STEEL

[75] Inventors: Ikuo Ochiai, Kimitsu; Hideaki Omori, Chiba; Manjiro Sato, Chofu; Masatsugu Murao, Higashiosaka; Kazuhiko Murao, Osaka; Hideo Chiba, Minoo; Tsuneo Okamoto, Hiratsuka; Tadashi Fuku, Ichihara, all of Japan

[73] Assignee: The Furukawa Electric Co., Ltd., Tokyo, Japan

[21] Appl. No.: 455,338

[22] PCT Filed: Apr. 27, 1989

[86] PCT No.: PCT/JP89/00444

§ 371 Date: Feb. 13, 1990

§ 102(e) Date: Feb. 13, 1990

[87] PCT Pub. No.: WO89/10420

PCT Pub. Date: Nov. 2, 1989

[30] Foreign Application Priority Data

Apr. 30, 1988 [JP] Japan ................. 63-105436

[51] Int. Cl.⁵ ................. F16L 11/00; F16L 55/00
[52] U.S. Cl. ................. 138/140; 138/133; 138/134; 138/174; 420/99
[58] Field of Search ................. 138/132, 133, 134, 144, 138/174, 177, 140, 178, DIG. 5; 420/99

[56] References Cited

U.S. PATENT DOCUMENTS

| | | | |
|---|---|---|---|
| 1,927,986 | 9/1933 | Levy | 420/99 |
| 1,992,905 | 2/1935 | Wills | 420/99 |
| 2,079,907 | 5/1937 | Hawkridge | 420/99 |
| 2,347,916 | 5/1944 | Larrabee | 420/99 |
| 2,867,531 | 1/1959 | Holzwarth | 420/99 |
| 2,987,429 | 6/1961 | Smith | 420/99 |
| 3,880,195 | 4/1975 | Goodrich et al. | 138/DIG. 5 |
| 4,268,305 | 5/1981 | Leclerc et al. | 420/99 |
| 4,346,739 | 8/1982 | Asada | 138/177 |
| 4,402,346 | 9/1983 | Cheetham et al. | 138/133 |
| 4,549,581 | 10/1985 | Unno et al. | 138/174 |
| 4,737,392 | 4/1988 | Dambre | 420/99 |

FOREIGN PATENT DOCUMENTS 58-945556 6/1983 Japan.
59-232251 12/1984 Japan.
63-230847 9/1988 Japan.

Primary Examiner—James E. Bryant, III
Attorney, Agent, or Firm—Oblon, Spivak, McClelland, Maier & Neustadt

[57] ABSTRACT

High-strength steel having excellent hydrogen-induced crack resistance, particularly in an environment of wet hydrogen sulfide and wires made thereof and their assembly, steel pipes, steel bands and shielding wires for marine cable are disclosed. This steel contains 0.40 to 0.70% of C, 0.1 to 1% of Si, 0.2 to 1% of Mn, up to 0.25% of P and up to 0.010% of S, and further, if necessary, 0.008 to 0.050% of Al and the balance of Fe and unavoidable impurities, and has a spheroidized structure. In addition, a flexible sour fluid transport pipe made of the high-strength steel band having the above-described composition and a tensile strength of 50 to 80 kg/mm₂ is also disclosed.

3 Claims, 1 Drawing Sheet

FLEXIBLE FLUID TRANSPORT PIPE HAVING HYDROGEN-INDUCED CRACKING RESISTANT HIGH-STRENGTH STEEL

TECHNICAL FIELD

The present invention relates to a high-strength steel having excellent hydrogen-induced cracking resistance and sulfide stress corrosion cracking resistance and a steel wire, steel tube and further flexible fluid transport pipe shielded with said steel material, which have excellent characteristics particularly even in wet hydrogen sulfide environment.

TECHNICAL BACKGROUND

Recently, the sour environment containing hydrogen sulfide (environment of wet hydrogen sulfide) has become to be seen more frequently as the drilling wells for gas and crude oil become deep.

Up to this time, with the flexible fluid transport pipe having, for example, shielding wire around a plastic inner pipe as a metal reinforcing layer, which is used for the transport of, for example, crude oil etc., there has been a problem that water and hydrogen sulfide permeated through the plastic inner pipe stagnate between reinforcing layers and, by the action thereof, hydrogen-induced cracking (HIC), sulfide stress corrosion cracking (SSCC), etc. are caused in the metal reinforcing steel material, though said metal reinforcing layer does not contact directly with inside sour fluid.

With respect to the sulfide stress corrosion cracking there among, it is generally possible to prevent from the occurrence by making the hardness up to HRC 22 (Rockwell C hardness 22) in the case of carbon steel. For this reason, for the flexible fluid transport pipe to be used in a sour environment, a metal reinforcing material produced in such a way that a low-carbon steel wire material with up to 0.2 wt. % (hereinafter, wt. % is referred to as % simply) of C is worked to a shaped steel wire (flat wire or grooved wire) with a fixed shape in section through the drawing followed by the cold working such as shaped drawing, roller die processing, rolling or the like has been used hitherto as it is or after the low-temperature annealing of up to 500° C. to make the tensile strength up to 80 kgf/mm² (tensile strength of 80 kgf/mm² is approximately equal to HRC 22).

However, as the partial pressure of hydrogen sulfide rises in the use environment, it has become clear that the hydrogen-induced cracking occurs with the rolled low-carbon steel material.

Conventionally, a production example of steel plate excellent in the HIC characteristic is disclosed in Japanese Patent Publication No. Sho 63-1369. This contains up to 0.12% of C and special elements such as Ti, Mo, Ni, etc. and has the hydrogen-induced crack resistance through the control of rolling conditions. It is however remarkably difficult to assume or apply an art for giving the characteristic of hydrogen-induced cracking resistance to a steel wire with high C accompanying with cold processing from the invention of production method of said steel plate.

Moreover, when using conventional low-carbon steel as said reinforcing material, there has also been a problem that the decrease in strength at welds thereof is remarkable making it impossible to take large design stress.

DISCLOSURE OF THE INVENTION

As a result of extensive investigations in view of this situation, a high-strength steel having excellent hydrogen-induced cracking resistance and sulfide stress corrosion cracking resistance and less decrease in strength at welds has been developed according to the invention.

Namely, one embodiment of the invention relates to a high-strength steel having excellent hydrogen-induced cracking resistance, characterized in that it contains C: 0.40–0.70%,
Si: 0.1–1%,
Mn: 0.2–1%,
P: Up to 0.025%,
S: Up to 0.010%, and further, if necessary, Al: 0.008–0.050% and the balance of Fe and unavoidable impurities, and has a spheroidized structure.

Further, the invention provides a high-strength steel wire, assembly thereof, steel tube, steel band and shielding wire for marine cable made of said steel material.

Moreover, other embodiment of the invention relates to a flexible sour fluid transport pipe characterized in that, in the flexible fluid transport pipe comprising an inner pipe made of rubber or plastic, a metal reinforcing layer provided on said inner pipe and a plastic shell provided on said metal reinforcing layer, said metal reinforcing layer is formed from a high-strength steel strip with a tensile strength of 50 kgf/mm² to 80 kgf/mm2, wherein it contains C: 0.40–0.70%,
Si: 0.1–1%,
Mn: 0.2–1%,
P: Up to 0.025%,
S: Up to 0.010%, and further, if necessary, Al: 0.008–0.050% and the balance of Fe and unavoidable impurities, and has a spheroidized structure.

In following, the reasons why the alloy ingredients were restricted in the steel material, steel wire, etc. of the invention will be explained.

Since, under 0.40% of C, aiming strength cannot be achieved through the spheroidizing annealing and the decrease in strength at welds is significant, 0.4% was made to be a lower limit. Moreover, if C exceeds 0.70%, hard cold working becomes difficult and fine cracks occur inside the steel wire during processing resulting in not only the deterioration of HIC characteristic but also the occurrence of edge cracks, hence 0.70% was made to be an upper limit.

Si is necessary in amounts of at least 0.10% or more as a deoxidizer, and the strength improves with increasing amount thereof. But, if over 1%, the decarburization becomes violent in the cast pieces and heating furnace of billet. This will remain in the steel wire as it is and the cracks occur most often during cold working, hence the amount of over 1% is not preferable.

Mn is necessary in amounts of 0.2% or more for preventing from the hot brittleness. Moreover, since Mn is an element being inexpensive and improving the strength, the more the amount thereof, the more preferable. However, Mn is also an element tending to occur the segregation together with P and the occurring frequency of HIC due to the central segregation becomes high particularly in the invention, hence 1% was made to be an upper limit.

P tends to segregate in grain boundaries tending to decrease the the workability and induce the HIC cracks, hence the less the amount thereof, the more preferable. But, when producing by continuous casting, the returning of P due to high melt temperature occurs, hence only the upper limit was prescribed to 0.025%.

From the points of corrosion resistance in addition to the similar harmful effects to P, the less the amount of S, the more preferable. But, the amount was made to be up to 0.010%, which permits currently the economical production. Besides, the industrial production is enough possible in an amount of up to 0.001% of S.

There are cases to use Al for making the fine crystal grains and for deoxidizer and conversely not to add Al for specifying coarse-grain steel and for preventing the non-metallic inclusions in steel due to Al. When adding Al, it is necessary in amounts of at least 0.006% or more as a sol. Al required, for example, for making the grains fine. However, since the partition (ratio) of total amount of Al between sol. Al and insol. Al is 8:2 at this time, the lower limit was made to be 0.008%. If Al exceeds 0.050%, the non-metallic inclusions in steel increase to lower the product quality and yield. Taking the melt yield and the dispersion into account, 0.015 to 0.035% is usually preferable in the case of Al addition.

On the other hand, the amount of Al in steel shows a value under 0.008% in the case of no Al addition. Al has only to be used according to the purpose aforementioned, if need be.

Further, the feature of the invention lies in that, after the cold working of steel materials with compositions as described above, the spheroidizing annealing is performed to eliminate the work strain and, at the same time, to change from the pearlitic structure to a structure dispersed the fine spheroidized cementite into the ferrite (matrix), that is, the spheroidized structure.

And, it has newly been found that the spheroidized structure obtained by annealing is very excellent in the HIC characteristic over the pearlitic structure. This is considered to be due to that the hydrogen atoms intruded into steel build up at the boundary of cementite/ferrite and form there the nuclei for HIC, but, in the case of spheroidized structure (cementite), because of the small concentration of stress, the occurrence of cracks is suppressed and no local domains of high dislocation density which becames the propagating route of cracks exist to make the characteristic of hydrogen-induced cracking resistance excellent.

Moreover, the extent of spheroidized structure of the invention is preferable to be No. 1 through No. 3 among the divisions No. 1 through No. 6 shown in the photograph of spheroidized structure according to, for example, JIS G3539.

This is because of that, if over No. 4, the extent of spheroidization is small resulting in the occurrence of cracks due to HIC, which is not preferable.

Besides, in order to achieve the preferable spheroidized structure with the ingredient systems of the invention, an annealing temperature of 600° C. or so is necessary.

The steel of the invention can be used through working as a steel wire or steel cable assembled this, steel band or steel tube. Among these, the steel wire is the general term of shaped steel wires (flat wire and grooved wire), the fixed shape in section being circular, square or angular, wherein the steel materials (wire material, rod steel, etc.) are subject to the processings such as shaped drawing, roller die processing, rolling and the like.

There, if using these processed steel wire and steel band as they are, HIC occurs at portions inside the steel wire where the strains tend to concentrate relatively, hence the annealing is necessary. However, if the tensile strength of steel wire exceeds 80 kgf/mm$^2$ after annealing, the hardness would become over HRC 22 to cause the sulfide stress corrosion cracking, thus the upper limit of tensile strength is required to be up to 80 kgf/mm$^2$.

And, for the shielding steel wire to be used as a metal reinforcing layer of flexible fluid transport pipe, for example, deep well aforementioned, large design stress is taken and, to alleviate the weight of flexible pipe, the tensile strength is necessary to be 50 kgf/mm$^2$ or more. If not satisfying this, said transport pipe ends up not to be endurable against both of internal pressure and external pressure.

Figure 1:
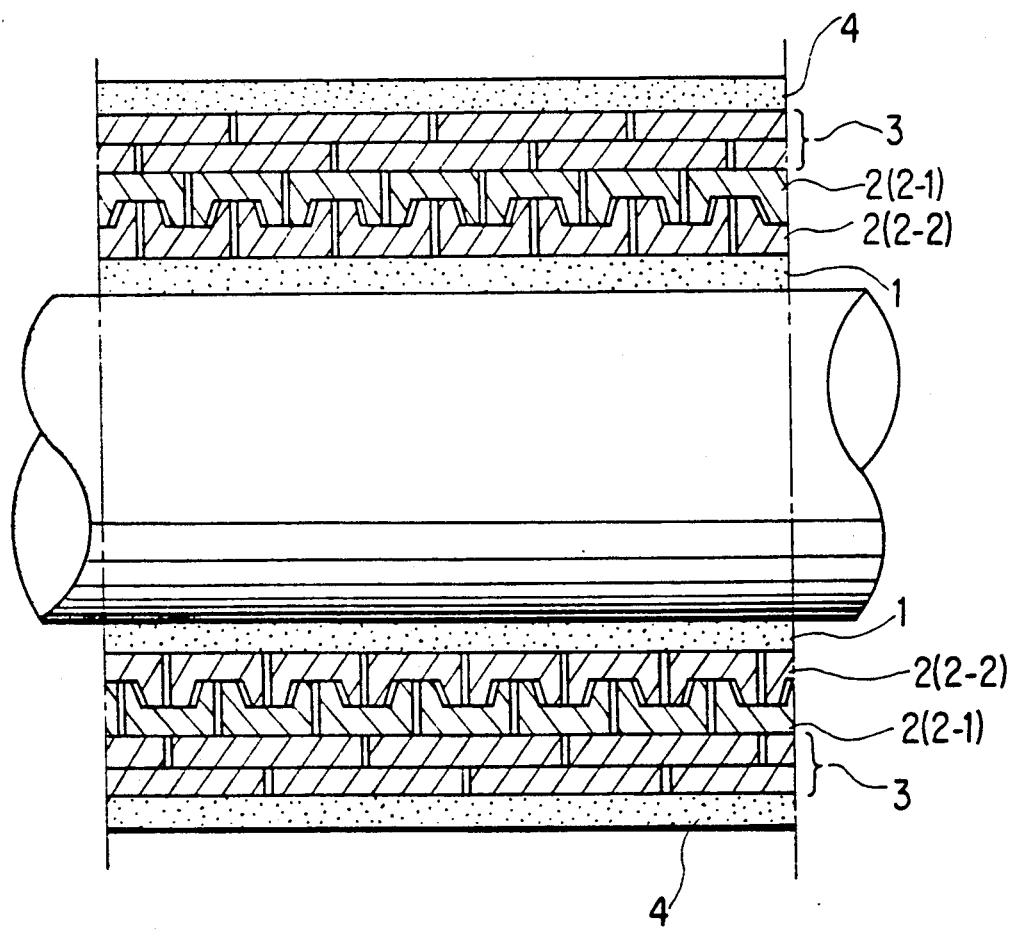
FIG. 1 is a longitudinal cross section of flexible sour fluid transport pipe in accordance with the invention. Best embodiment for putting the invention into effect In following, the examples compared the characteristics of the steel materials of the invention with those of conventional materials and comparative materials will be illustrated.

The wire materials (9.5 mmφ and 5.5 mmφ) with chemical composition shown in Table 1 were subject to cold die processing and flat rolling to produce flat wires with a thickness of about 3 mm to 0.9 mm. Then, after the annealing at temperatures listed in Table 2, tensile test and HIC test were performed. The results are shown in Table 2.

For the tensile test, strip with a length of 450 mm was used. The evaluation of HIC characteristic was performed according to following method: Namely, a flat wire as above was cut in a length of 100 mm and dipped into a solution of 5% NaCl-0.5% CH$_3$COOH-saturated H$_2$S for 96 hours at 25° C. Then three cross sections were polished and the existence of microcracks were observed under optical microscope.

Besides, No. 1 through No. 10 in Table 1 are wire materials with a diameter of 9.5 mmφ before cold processing and No. 11 through No. 14 are those with 5.5 mmφ. Thereamong, the wire materials of the invention are No. 1 through No. 5, No. 11 and No. 12 and No. 15 and No. 16, the others being comparative materials and conventional materials.

TABLE 1

| No. *3 | Division | Chemical composition | | | | | |
|---|---|---|---|---|---|---|---|
| | | C | Si | Mn | P | S | Al |
| 1 | Material of invention | 0.42 | 0.22 | 0.75 | 0.015 | 0.003 | 0.005 |
| 2 | Material of invention | " | " | " | " | " | " |
| 3 | Material of invention | " | " | " | " | " | " |
| 4 | Material of invention | " | " | " | " | " | " |
| 5 | Material of invention | " | " | " | " | " | " |
| 6 | Comparative material | " | " | " | " | " | " |
| 7 | Comparative material | " | " | " | " | " | " |
| 8 | Conventional material | 0.20 | 0.22 | 0.50 | 0.015 | 0.015 | 0.023 |
| 9 | Conventional material | " | " | " | " | " | " |
| 10 | Conventional | 0.09 | 0.15 | 0.24 | 0.018 | 0.008 | 0.007 |

TABLE 1-continued

| No. *3 | Division | Chemical composition | | | | | |
|---|---|---|---|---|---|---|---|
| | | C | Si | Mn | P | S | Al |
| | material | | | | | | |
| 11 | Material of invention | 0.65 | 0.24 | 0.71 | 0.015 | 0.005 | 0.025 |
| 12 | Material of invention | " | " | " | " | " | " |
| 13 | Comparative material | " | " | " | " | " | " |
| 14 | Comparative material | " | " | " | " | " | " |
| 15 | Material of invention | 0.61 | 0.15 | 0.80 | 0.015 | 0.003 | 0.003 |
| 16 | Material of invention | " | " | " | " | " | " |

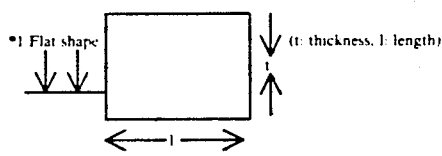

*1 Flat shape (t: thickness, l: length)

*2 In conformity to the divisions No. 1 through No. 6 in ← the photograph 1 of spheroidized structure according to JIS G3539

*3 Under No. 1 through No. 10 and under No. 11 through No. 16, wire materials with 9.5 mm⌀ and with 5.5 mm⌀ were processed in cold, respectively

TABLE 2

| No.*3 | Division | Shape on cold working*1 t × l (mm) | Annealing temperature (°C.) | Results | | |
|---|---|---|---|---|---|---|
| | | | | Tensile strength (Kgf/mm$^2$) | Occurring rate of HIC (%) | Extent of spheroidized structure*2 |
| 1 | Material of invention | 2.85 × 16 | 600 | 63 | 0 | No. 3 |
| 2 | Material of invention | 1.89 × 18 | 600 | 65 | 0 | No. 3 |
| 3 | Material of invention | 1.45 × 19 | 600 | 64 | 0 | No. 3 |
| 4 | Material of invention | 1.24 × 14 | 600 | 64 | 0 | No. 3 |
| 5 | Material of invention | 0.9 × 16 | 600 | 62 | 0 | No. 3 |
| 6 | Comparative material | 2.85 × 16 | No annealing | 115 | 80 | — |
| 7 | Comparative material | 1.24 × 14 | 480 | 77 | 10 | No. 6 |
| 8 | Conventional material | 2.85 × 16 | 600 | 67 | 35 | No. 5 |
| 9 | Conventional material | 2.85 × 16 | No annealing | 95 | 37 | — |
| 10 | Conventional material | 2.85 × 16 | 450 | 75 | 60 | — |
| 11 | Material of invention | 2.02 × 4.9 | 600 | 74 | 0 | No. 3 |
| 12 | Material of invention | 2.02 × 7.4 | 600 | 72 | 0 | No. 2 |
| 13 | Comparative material | 2.02 × 4.9 | 720 | 46 | 0 | No. 1 |
| 14 | Comparative material | 1.02 × 7.4 | 720 | 48 | 0 | No. 1 |
| 15 | Material of invention | 2.02 × 4.9 | 600 | 73 | 0 | No. 2 |
| 16 | Material of invention | 1.02 × 7.4 | 600 | 71 | 0 | No. 2 |

As evident from Table 2, in the cases of wire materials without annealing (No. 6 and 9) and that with annealing at low temperature (No. 7) among the comparative and conventional materials, the tensile strength shows markedly high values and the cracks occur by HIC test.

Moreover, in the cases of wire materials with low C and high S in the ingredients (Conventional materials No. 8 and 10) being out of the invention, the spheroidization is insufficient and, because of more pearlitic structure, HIC occurs.

On the other hand, as can be seen with comparative materials No. 13 and 14, if the annealing temperature becomes high, the extent of spheroidized structure becomes better, but the tensile strength decreases, which is not preferable.

The wire materials of the invention are No. 2 and No. 3 in the extent of spheroidized structure, satisfy the tensile strength of 50 kgf/mm$^2$ or more and, in particular, show no occurrence of cracks at all by HIC.

As above, according to the invention, optimal spheroidized structure appears and the required characteristics of tensile strength and HIC are satisfied simultaneously.

Next, with respect to the flexible sour fluid transport pipe of the invention and conventional transport pipe, the characteristics of steel materials used therefor were compared. In this transport pipe, as shown in FIG. 1, inner reinforcing steel wire 2 (grooved steel wire) excellent in the hydrogen-induced cracking resistance is spirally wound on a plastic inner pipe 1 so as the upper layer 2-1 and the lower layer 2-2 to be engaged each other, and further outer reinforcing layer 3 (steel strip) with same material quality is spirally wound thereon with a pitch larger than that of inner reinforcing layer 2 so as two upper and lower layers to go in the opposite direction. The metal reinforcing layer may be formed with either one of inner and outer reinforcing layers (either 2 or 3). The most outer layer is a plastic shell and prevents the metal reinforcing layers from the damages from external environment.

An example of characteristics of said metal reinforcing layer is shown in Table 3 comparing with conventional material.

TABLE 3

| | Conventional material | Reinforcing material concerned with invention |
|---|---|---|
| Composition (%) | | |
| C | 0.13 | 0.42 |
| Si | 0.04 | 0.22 |
| Mn | 0.34 | 0.75 |
| P | 0.018 | 0.015 |
| S | 0.003 | 0.003 |
| Al | 0.047 | 0.015 |
| Annealing temperature | 450° C. | 600° C. |
| Annealing time | 90 min. | 4 hr. |
| Tensile strength | 65 kg/mm$^2$ | 70 kg/mm$^2$ |
| Hydrogen-induced cracking* | Occurrence of cracks | No cracks |
| Sulfide stress corrosion cracking** | No cracks | No cracks |
| Tensile strength at welds | 45 kg/mm$^2$ | 65 kg/mm$^2$ |

*Test method conforms to NACE (American Corrosion Engineering Association) standard TM-02-84.
**Test method conforms to NACE standard TM-01-77.

According to Table 3, with the reinforcing material concerned with the invention, there is no occurrence of hydrogen-induced cracks and yet the tensile strengths at normal portion and welds are higher than those of conventional article.

UTILIZABILITY IN THE INDUSTRY

As described above, the high-strength steel of the invention is very excellent in the characteristic of hydrogen-induced cracking and never destroyed even if used in a severe environment of wet hydrogen sulfide.

Hence, by using the high-strength steel of the invention for the metal reinforcing layer of flexible pipe for transporting sour fluid as a steel strip harmful damages such as hydrogen-induced cracking, sulfide stress corrosion cracking, etc. do not occur and further the strengths at normal portion and welds of said reinforcing layer are high, thereby it has become possible to take high design stress and to open a way for lightening the flexible pipe.

Moreover, although the application examples of the invention were confined to the flat wire and shielding wire, the steel having the ingredients and structure of the invention can be utilized for the steel materials such as bolt, nut, rod steel, etc., for which same characteristics are required, and further, when processing to the tube, it can be utilized for the pipe for oil field, warm water pipe for geothermal generation, various pipes for laying undersea, or the like as well. The invention exerts therefore significant effects industrially.

We claim:

1. A flexible sour fluid transport pipe characterized in that, in the flexible fluid transport pipe comprising an inner pipe made of rubber or plastic, a metal reinforcing layer provided on said inner pipe and a plastic shell provided on said metal reinforcing layer, said metal reinforcing layer is formed from a high-strength steel strip or steel wire with a tensile strength of 50 kg/mm$^2$ to 80 kg/mm$^2$, wherein said metal reinforcing layer contains C: 0.40-0.70%,
Mn: 0.20-1%,
S: 0.0-0.010%,
Si: 0.1-1%,
P: up to 0.025%, and the balance of Fe and unavoidable impurities, and has a spheroidized structure.

2. The flexible sour fluid pipe of claim 1, wherein the high-strength steel strip or steel wire additionally contains Al: 0.008-0.050%.

3. The flexible sour fluid transport pipe of claim 1, wherein the spheroidized structure is obtained by an annealing temperature of at least 600° C.

* * * * *